US012810166B2

(12) United States Patent
Lee et al.

(10) Patent No.: US 12,810,166 B2
(45) Date of Patent: Nov. 24, 2026

(54) METHOD FOR TRANSMITTING SEMANTIC DATA AND DEVICE FOR SAME IN WIRELESS COMMUNICATION SYSTEM

(71) Applicant: LG ELECTRONICS INC., Seoul (KR)

(72) Inventors: Kyungho Lee, Seoul (KR); Sangrim Lee, Seoul (KR); Ikjoo Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 402 days.

(21) Appl. No.: 18/697,716

(22) PCT Filed: Oct. 1, 2021

(86) PCT No.: PCT/KR2021/013524
§ 371 (c)(1),
(2) Date: Apr. 1, 2024

(87) PCT Pub. No.: WO2023/054777
PCT Pub. Date: Apr. 6, 2023

(65) Prior Publication Data
US 2025/0232179 A1 Jul. 17, 2025

(51) Int. Cl.
*G06N 3/09* (2023.01)
*G06N 3/094* (2023.01)

(52) U.S. Cl.
CPC ............... *G06N 3/09* (2023.01); *G06N 3/094* (2023.01)

(58) Field of Classification Search
None
See application file for complete search history.

(56) References Cited

U.S. PATENT DOCUMENTS

2014/0309989 A1 10/2014 Sikstrom et al.

OTHER PUBLICATIONS

Strinati, Emilio Calvanese, and Sergio Barbarossa. "6G networks: Beyond Shannon towards semantic and goal-oriented communications." Computer Networks 190 (2021): 107930. (Year: 2021).*

(Continued)

*Primary Examiner* — Daniel T Pellett
(74) *Attorney, Agent, or Firm* — LEE, HONG, DEGERMAN, KANG & WAIMEY

(57) ABSTRACT

There is provided a method for a transmitting end to transmit semantic data in a semantic wireless communication system. More specifically, the method comprises transmitting, to a receiving end, (i) a distance rule for determining a distance between the semantic data determined based on a similarity between the semantic data and (ii) a mapping rule for generating a global semantic space for learning a semantic neural network, wherein the mapping rule is defined so that a difference value between (i) the distance between the semantic data determined based on the distance rule and (ii) a distance between locations on the global semantic space to which the semantic data is mapped is minimized for all the semantic data, and a distribution of the locations on the global semantic space to which the semantic data is mapped satisfies a required transmission power limitation condition; generating the global semantic space based on the distance rule and the mapping rule, wherein the global semantic space includes the semantic data mapped to satisfy the mapping rule; learning the semantic neural network based on a neural network supervised learning for (i) the generated global semantic space and (ii) a semantic space of a semantic encoder neural network constituting the semantic neural network; and transmitting, to the receiving end, the semantic data based on the learned semantic neural network.

12 Claims, 13 Drawing Sheets

(56) References Cited

OTHER PUBLICATIONS

Shi, Guangming, et al. "A new communication paradigm: From bit accuracy to semantic fidelity." arXiv preprint arXiv:2101.12649 (2021). (Year: 2021).*
Xie, Huiqiang, and Zhijin Qin. "A lite distributed semantic communication system for Internet of Things." IEEE Journal on Selected Areas in Communications 39.1 (2020): 142-153. (Year: 2020).*
Shi, Guangming, et al. "From semantic communication to semantic-aware networking: Model, architecture, and open problems." IEEE Communications Magazine 59.8 (2021): 44-50. (Year: 2021).*
Lan, Qiao, et al. "What is semantic communication? A view on conveying meaning in the era of machine intelligence." Journal of Communications and Information Networks 6.4 (2021): 336-371. (Year: 2021).*
PCT International Application No. PCT/KR2021/013524, International Search Report dated Jun. 24, 2022, 2 pages.
Baek, Donghyeon et al., "Exploiting a Joint Embedding Space for Generalized Zero-Shot Semantic Segmentation," arXiv:2108.06536v1, Aug. 2021, 17 pages.
Witherspoon, Shalisha et al., "SEEC: Semantic Vector Federation across Edge Computing Environments," arXiv:2008.13298v1, Aug. 2020, 12 pages.
Bao, Yu et al., "Generating Sentences from Disentangled Syntactic and Semantic Spaces," arXiv:1907.05789v1, Jul. 2019, 11 pages.
Chen, Long et al., "Zero-Shot Visual Recognition using Semantics-Preserving Adversarial Embedding Networks," arXiv:1712.01928v1, Mar. 2018, 10 pages.

* cited by examiner

【FIG. 1】
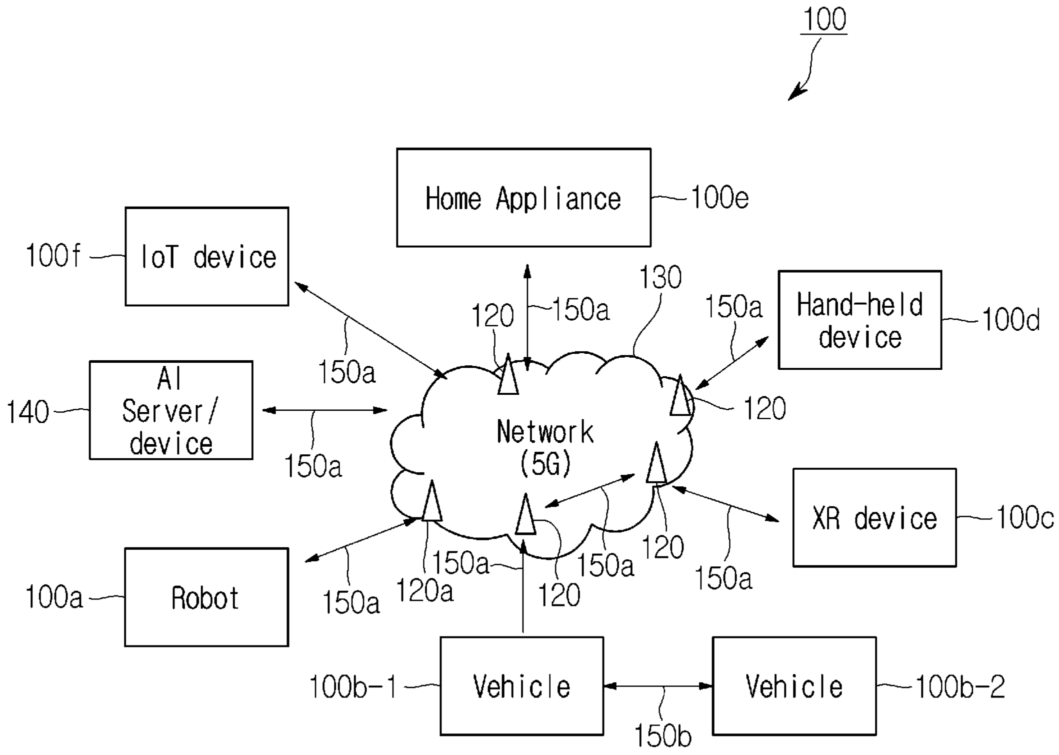
【FIG. 2】
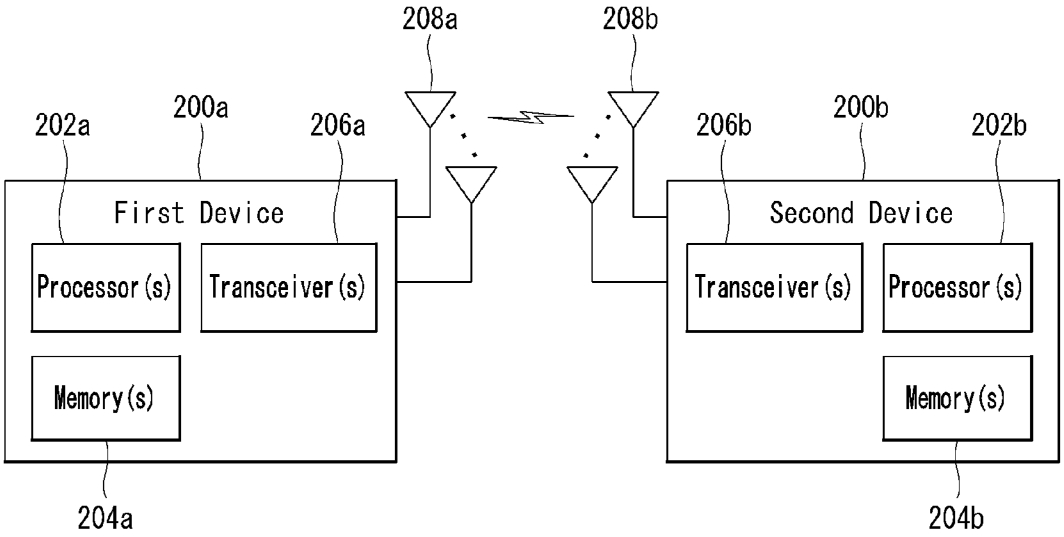

【FIG. 3】
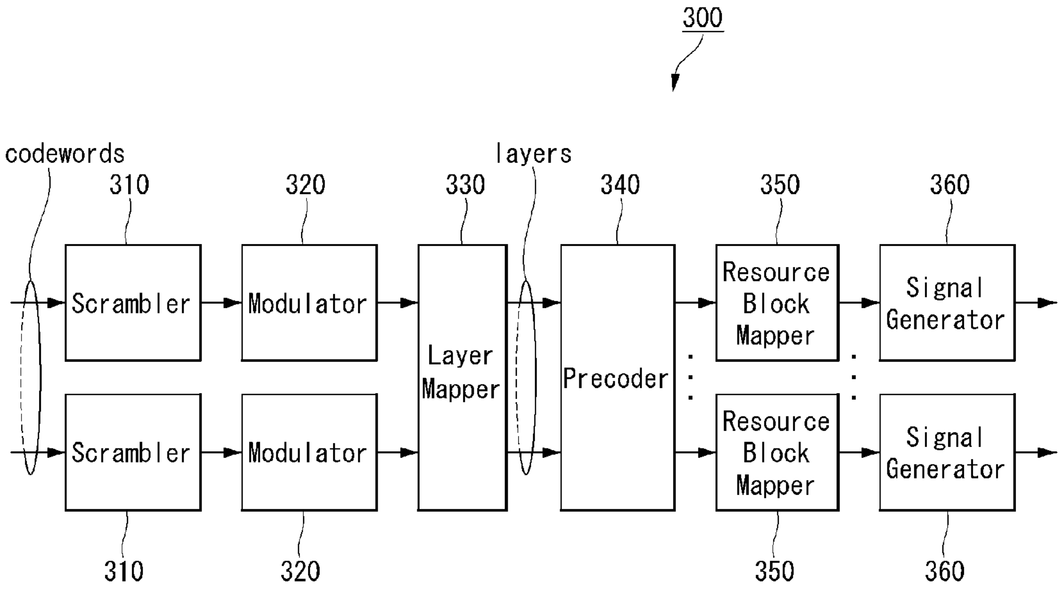
【FIG. 4】
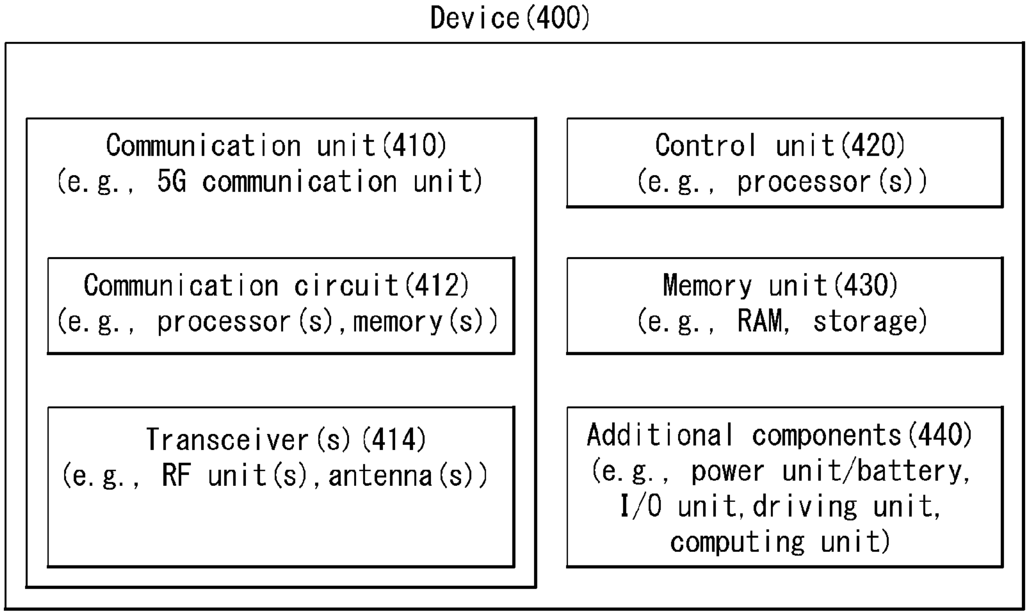

【FIG. 5】
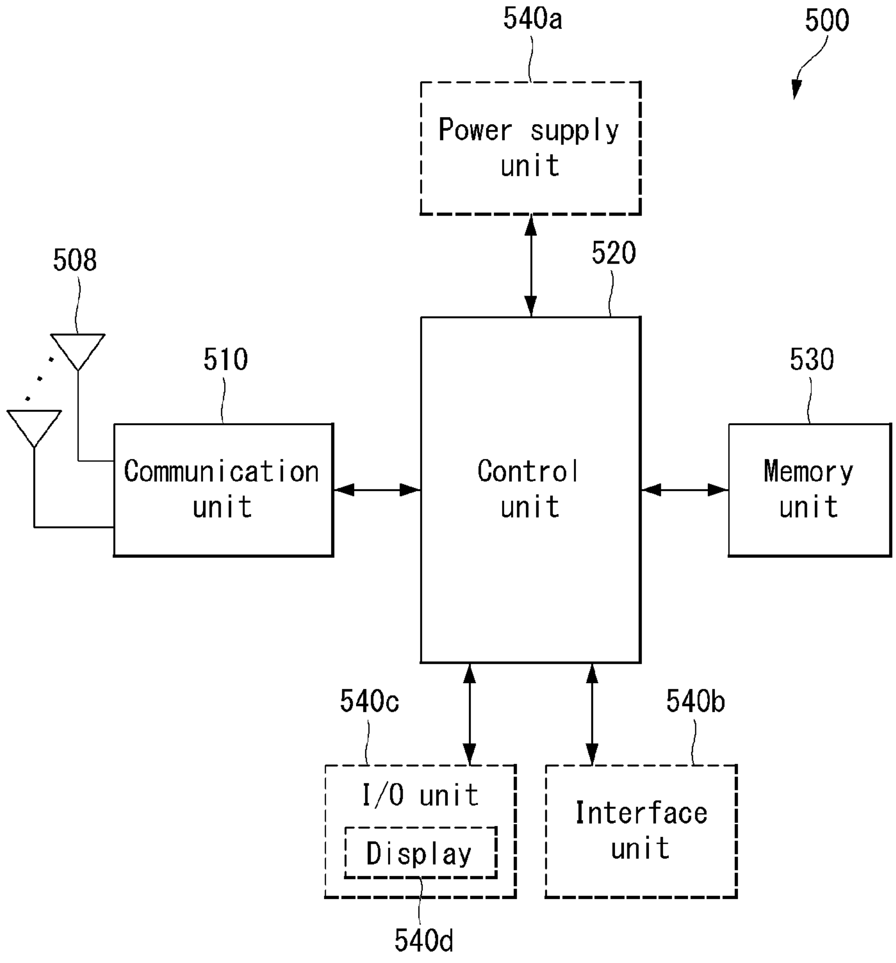

【FIG. 6】
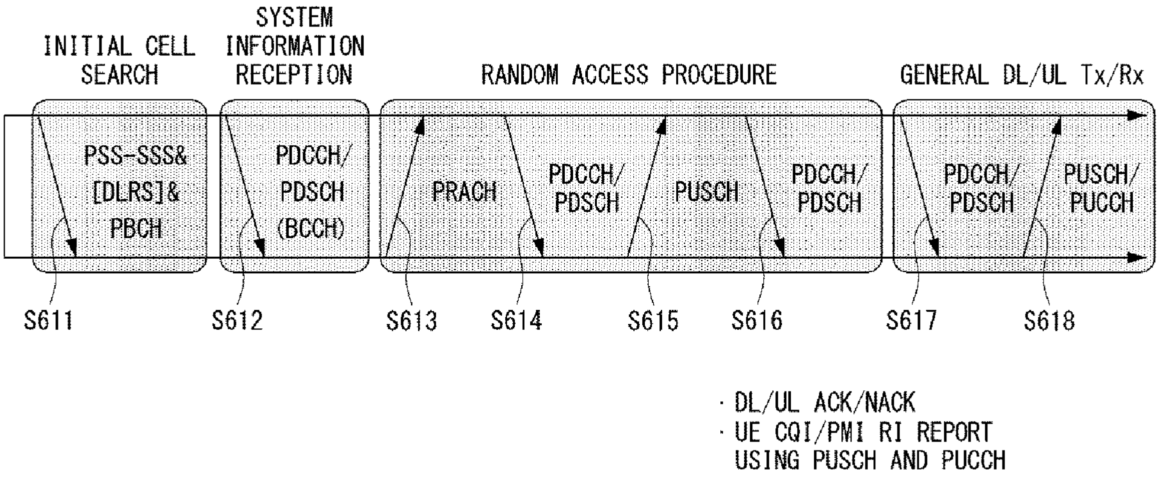

【FIG. 7】
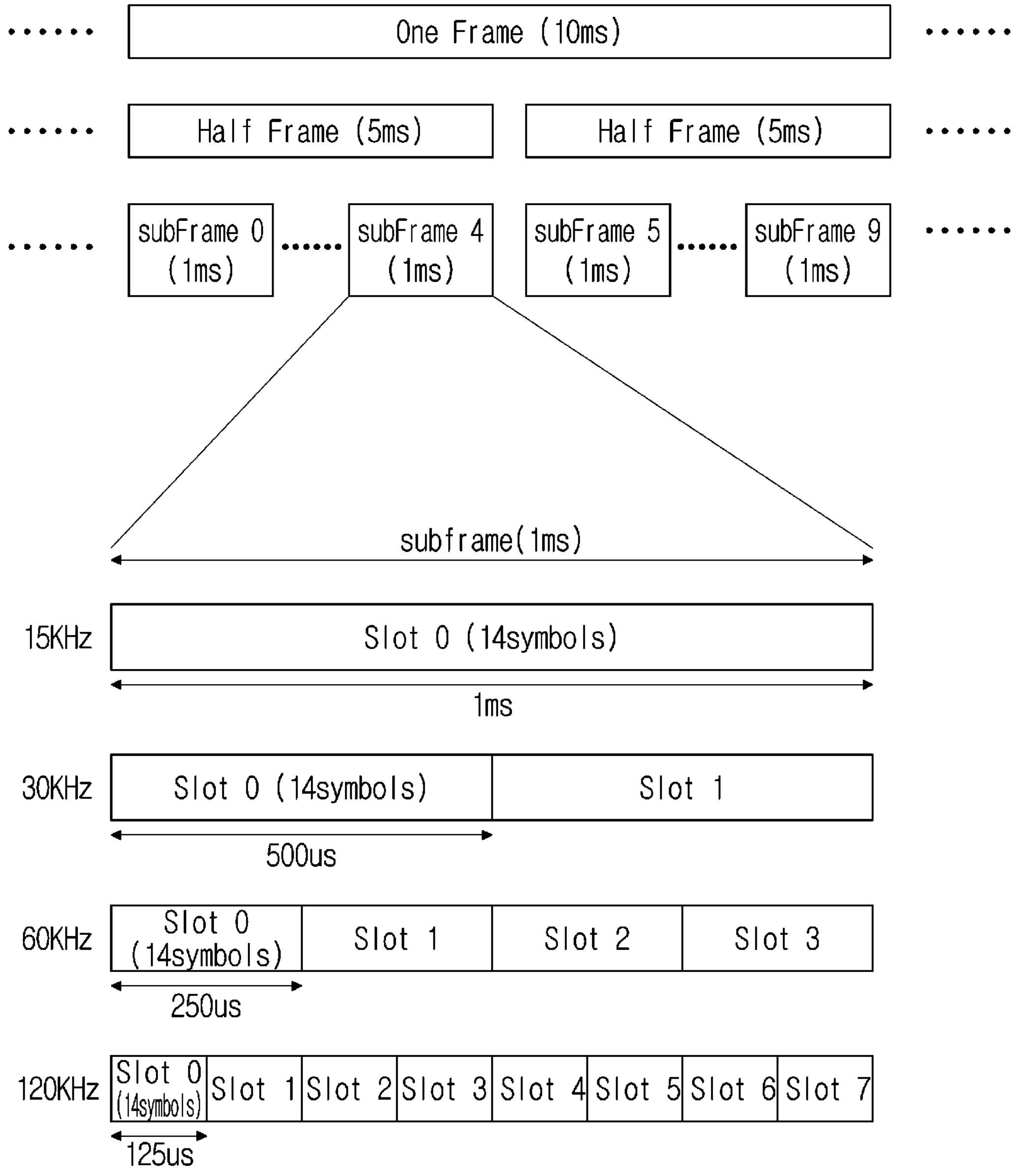

【FIG. 8】
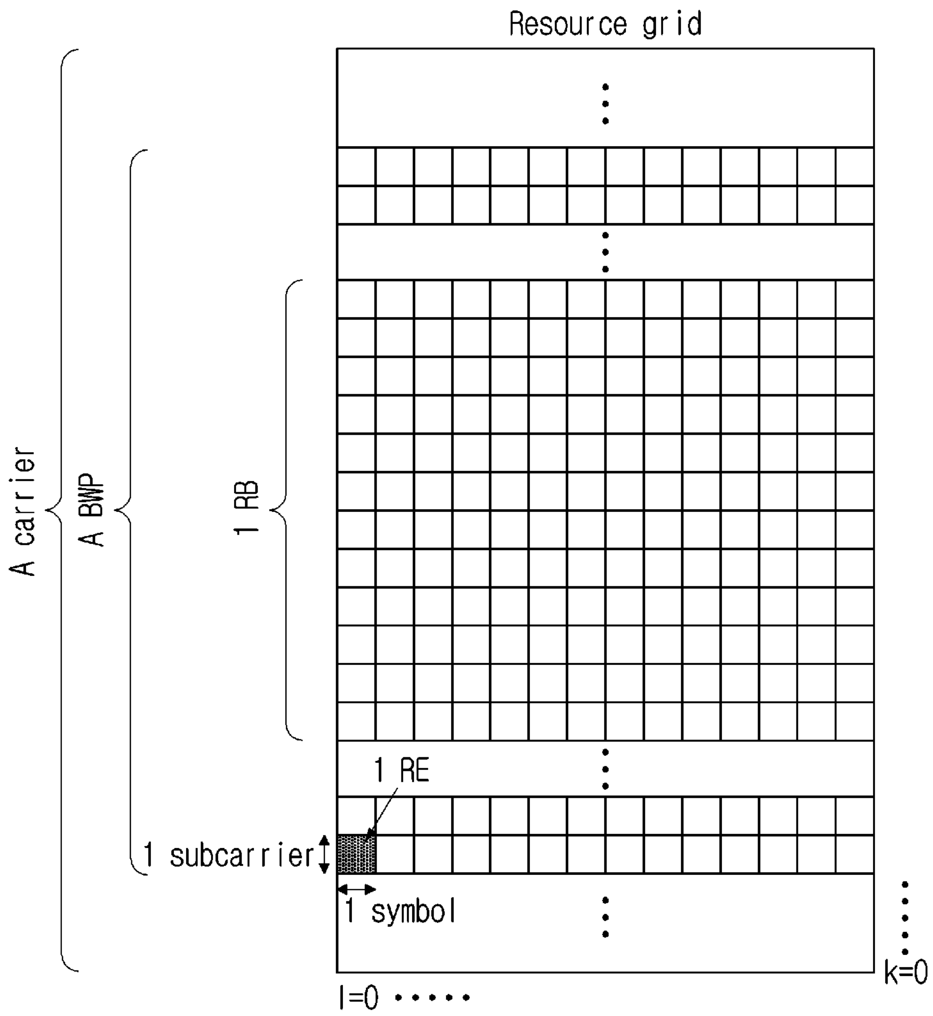

【FIG. 9】
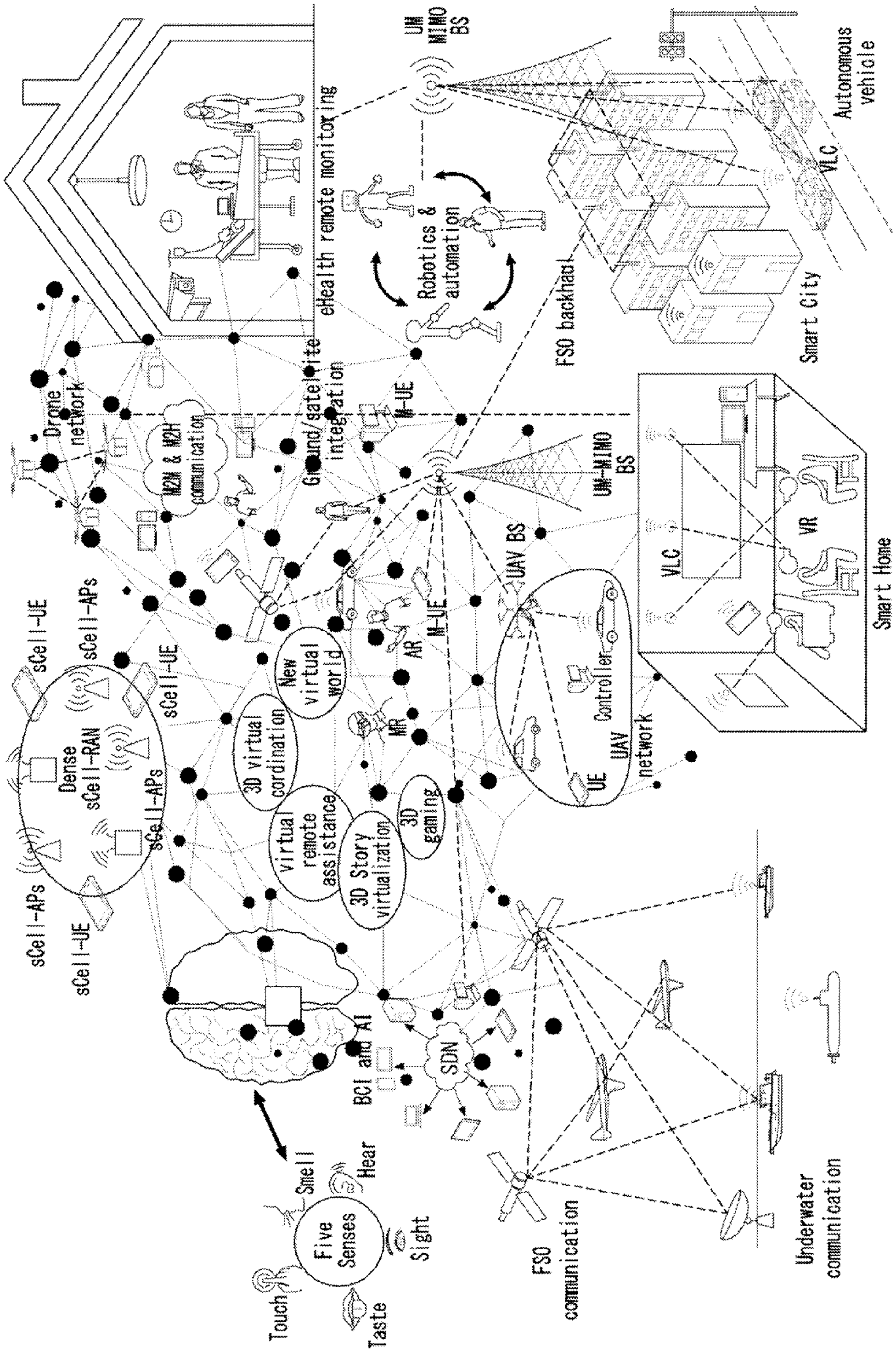

【FIG. 10】
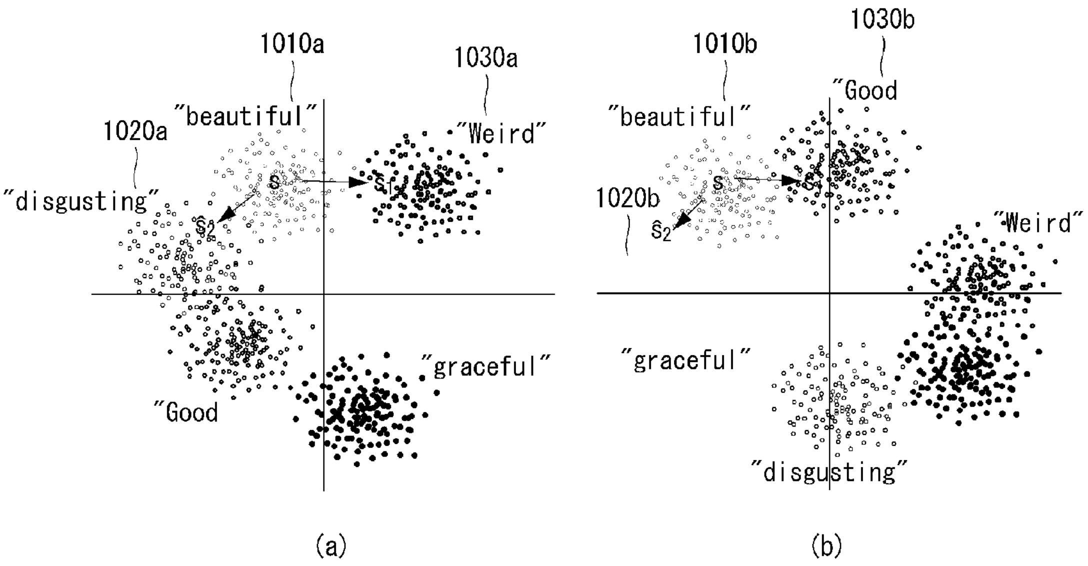

【FIG. 11】
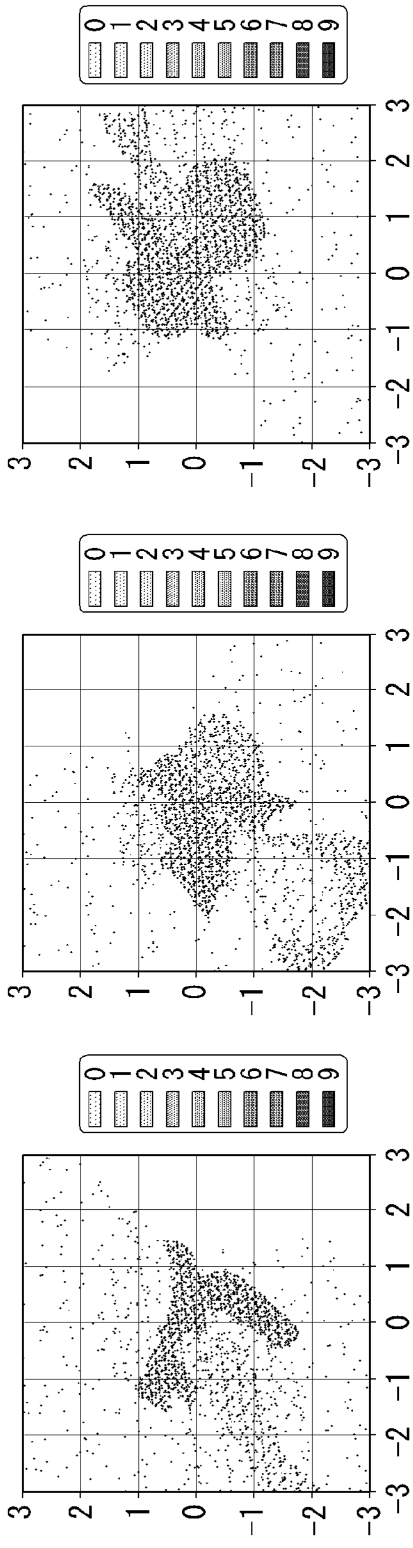
(a) (b) (c)

【FIG. 12】
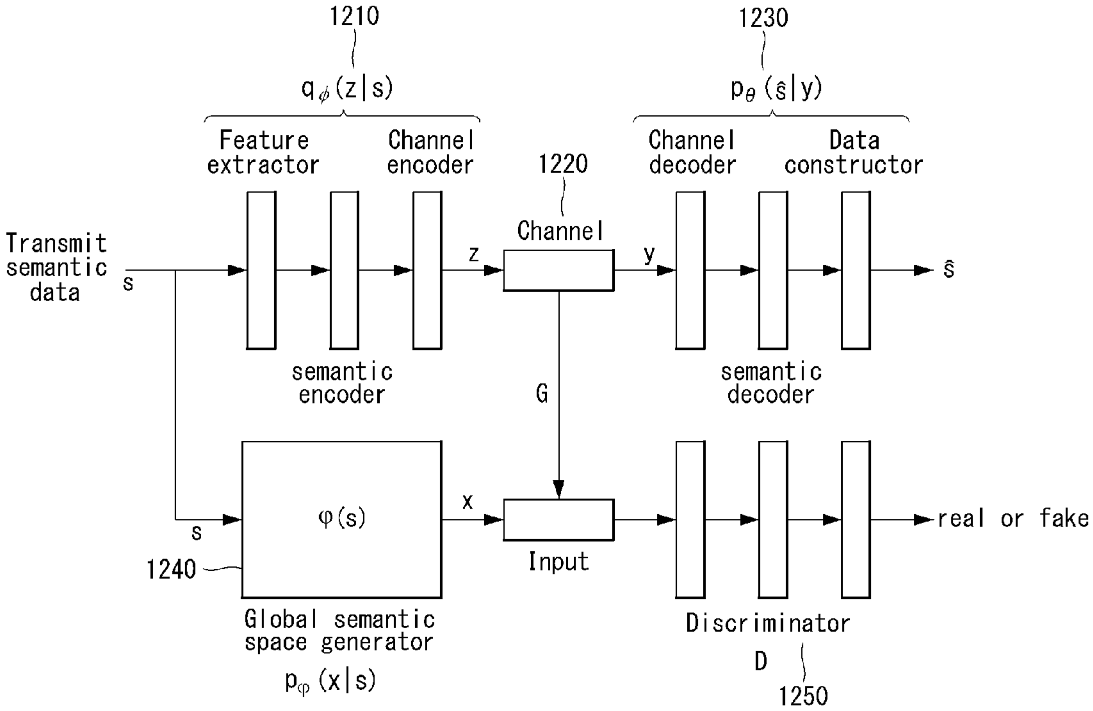

【FIG. 13】
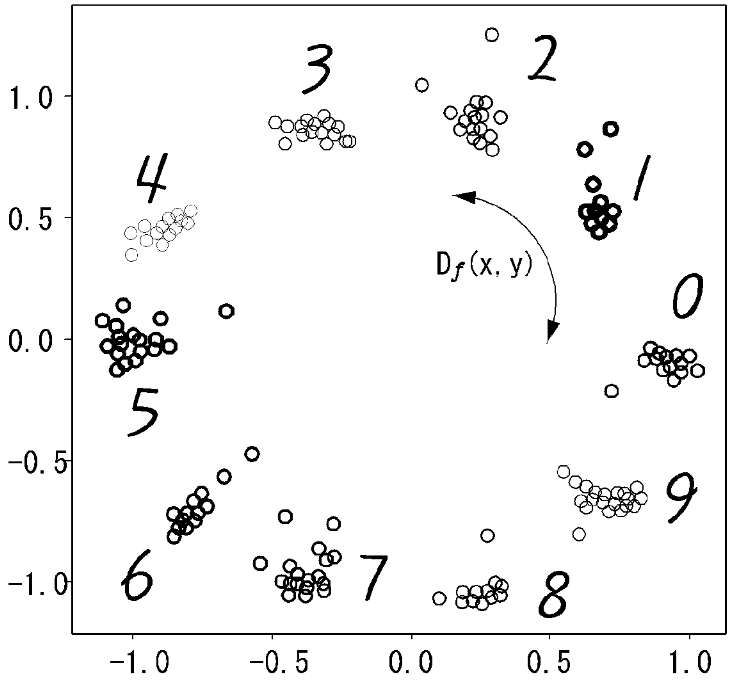
【FIG. 14】
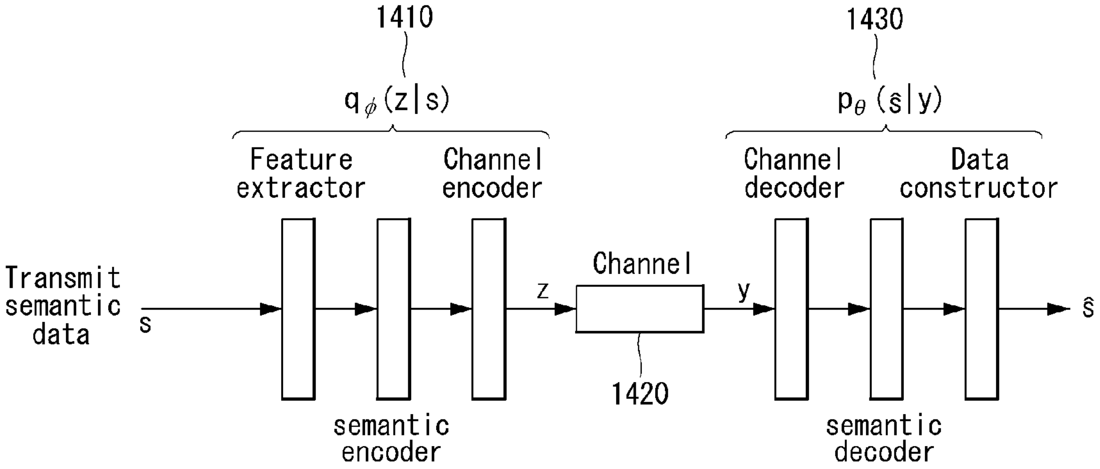

【FIG. 15】
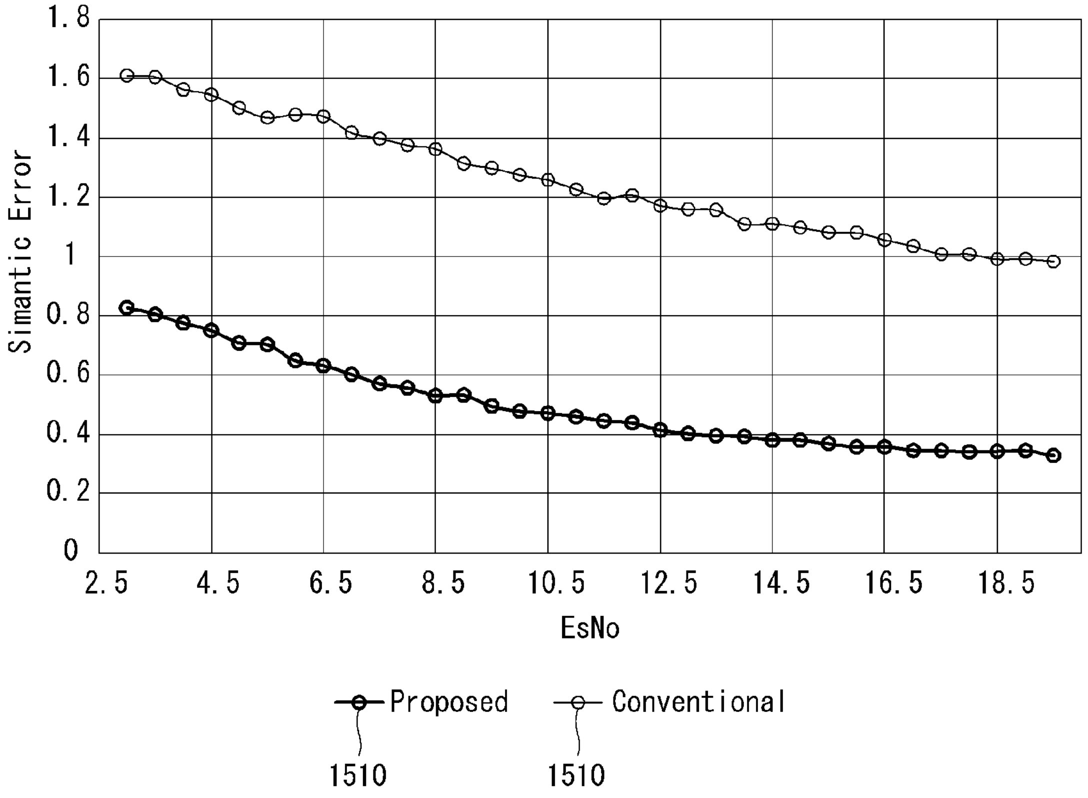
【FIG. 16】
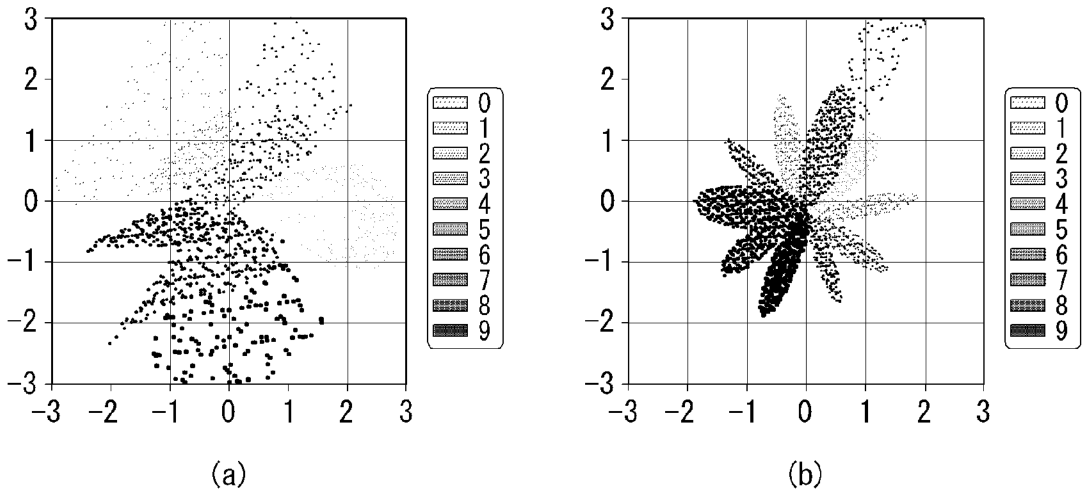

【FIG. 17】
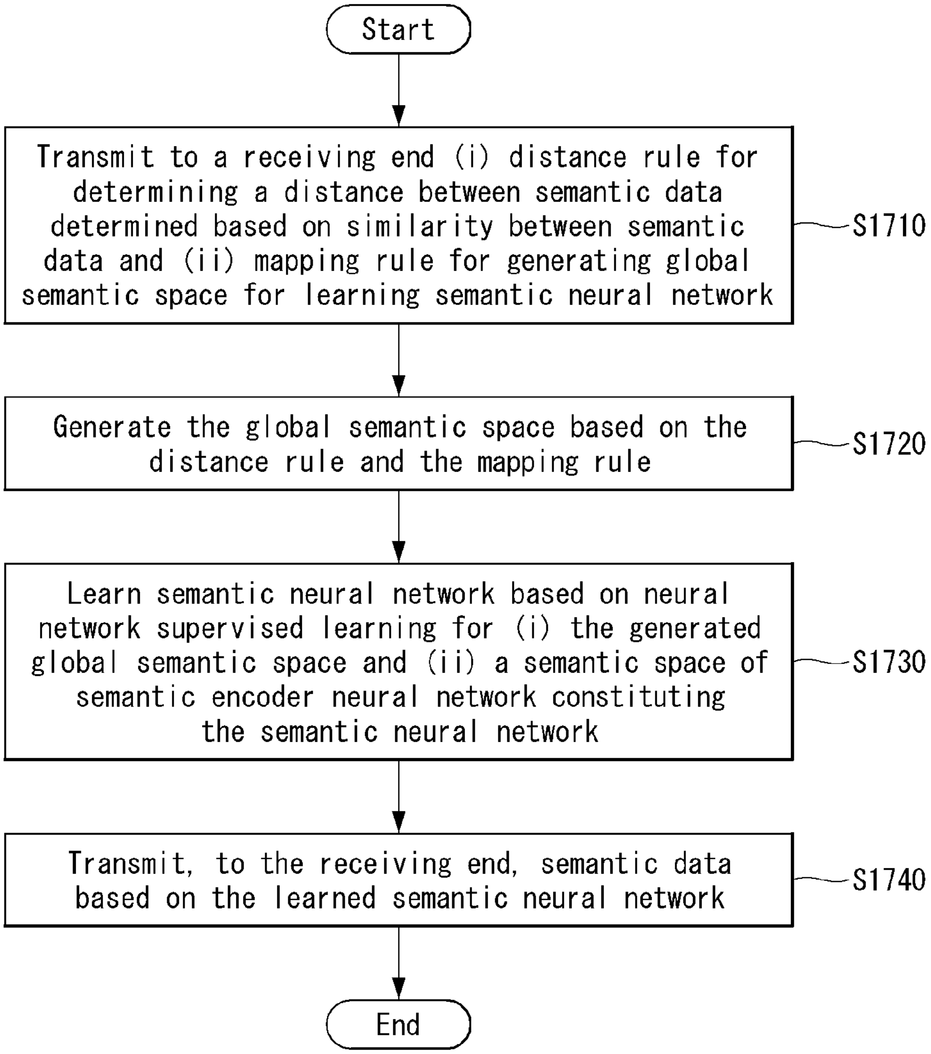

METHOD FOR TRANSMITTING SEMANTIC DATA AND DEVICE FOR SAME IN WIRELESS COMMUNICATION SYSTEM

CROSS-REFERENCE TO RELATED APPLICATION(S)

This application is the National Stage filing under 35 U.S.C. 371 of International Application No. PCT/KR2021/013524, filed on Oct. 1, 2021, the contents of which are all hereby incorporated by reference herein in their entirety.

TECHNICAL FIELD

The present disclosure relates to a semantic communication method, and more particularly to a method for a transmitting end to transmit semantic data in a wireless communication system and a device therefor.

BACKGROUND ART

Wireless communication systems have been widely deployed to provide various types of communication services such as voice or data. In general, the wireless communication system is a multiple access system capable of supporting communication with multiple users by sharing available system resources (bandwidth, transmission power, etc.). Examples of multiple access systems include a Code Division Multiple Access (CDMA) system, a Frequency Division Multiple Access (FDMA) system, a Time Division Multiple Access (TDMA) system, a Space Division Multiple Access (SDMA) system, an Orthogonal Frequency Division Multiple Access (OFDMA) system, a Single Carrier Frequency Division Multiple Access (SC-FDMA) system, and an Interleave Division Multiple Access (IDMA) system.

DISCLOSURE

Technical Problem

An object of the present disclosure is to provide a method for a transmitting end to transmit semantic data in a wireless communication system and a device therefor.

Another object of the present disclosure is to provide a method of generating a global semantic space considering configuration of the global semantic space and a device therefor.

Another object of the present disclosure is to provide a semantic communication method through adversarial learning of a semantic neural network based on a global semantic space considering configuration of the global semantic space and a device therefor.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

The present disclosure provides a method of transmitting semantic data in a wireless communication system and a device therefor.

More specifically, the present disclosure provides a method of transmitting, by a transmitting end, semantic data in a semantic wireless communication system comprising transmitting, to a receiving end, (i) a distance rule for determining a distance between the semantic data determined based on a similarity between the semantic data and (ii) a mapping rule for generating a global semantic space for learning a semantic neural network, wherein the mapping rule is defined so that a difference value between (i) the distance between the semantic data determined based on the distance rule and (ii) a distance between locations on the global semantic space to which the semantic data is mapped is minimized for all the semantic data, and a distribution of the locations on the global semantic space to which the semantic data is mapped satisfies a required transmission power limitation condition; generating the global semantic space based on the distance rule and the mapping rule, wherein the global semantic space includes the semantic data mapped to satisfy the mapping rule; learning the semantic neural network based on a neural network supervised learning for (i) the generated global semantic space and (ii) a semantic space of a semantic encoder neural network constituting the semantic neural network; and transmitting, to the receiving end, the semantic data based on the learned semantic neural network.

The global semantic space may include at least one cluster constructed based on the semantic data mapped to satisfy the mapping rule.

The global semantic space may be configured so that clusters including semantic data with similar meanings among the at least one cluster are contiguous to each other.

The global semantic space may be configured so that a distance between clusters including semantic data with dissimilar meanings among the at least one cluster is greater than a specific value.

The specific value may be determined based on a channel state between the transmitting end and the receiving end.

The method may further comprise receiving, from the receiving end, a signal for a measurement of the channel state; transmitting, to the receiving end, information on the channel state measured based on the signal; and receiving, from the receiving end, information on the specific value determined based on the information on the channel state. The global semantic space may be generated based on the information on the specific value.

A magnitude of the specific value may be determined in proportion to a degree of signal distortion through a channel between the transmitting end and the receiving end.

The mapping rule may be generated based on an equation below:

$$\arg_{\varphi(s_i),\varphi(s_j)} \min \sum_i \sum_j \|d_f(s_i, s_j) - d_g(x_i, y_j)\| \quad \text{[Equation]}$$

where si and sj are the semantic data, $x_i$, $y_j$ are locations on the global semantic space of si and sj, and $d_f$ and $d_g$ are the distance rule.

The neural network supervised learning may be an adversarial learning. A semantic space generator generating the global semantic space may serve as a real generation network, and the semantic encoder neural network may serve as a fake generation network, thereby performing the adversarial learning.

The transmission power (P) limitation condition may satisfy an equation below:

$$E[\|x^2\|] < P \text{ or } \max x^2 < P \quad \text{[Equation]}$$

where x is locations on the global semantic space of the semantic data.

The present disclosure also provides a transmitting end transmitting semantic data in a semantic wireless communication system comprising a transmitter configured to transmit a radio signal; a receiver configured to receive the radio signal; at least one processor; and at least one computer memory operably connectable to the at least one processor, wherein the at least one computer memory is configured to store instructions performing operations based on being executed by the at least one processor, wherein the operations comprise transmitting, to a receiving end, (i) a distance rule for determining a distance between the semantic data determined based on a similarity between the semantic data and (ii) a mapping rule for generating a global semantic space for learning a semantic neural network, wherein the mapping rule is defined so that a difference value between (i) the distance between the semantic data determined based on the distance rule and (ii) a distance between locations on the global semantic space to which the semantic data is mapped is minimized for all the semantic data, and a distribution of the locations on the global semantic space to which the semantic data is mapped satisfies a required transmission power limitation condition; generating the global semantic space based on the distance rule and the mapping rule, wherein the global semantic space includes the semantic data mapped to satisfy the mapping rule; learning the semantic neural network based on a neural network supervised learning for (i) the generated global semantic space and (ii) a semantic space of a semantic encoder neural network constituting the semantic neural network; and transmitting, to the receiving end, the semantic data based on the learned semantic neural network.

The present disclosure also provides a method of receiving, by a receiving end, semantic data in a semantic wireless communication system comprising receiving, from a transmitting end, (i) a distance rule for determining a distance between the semantic data determined based on a similarity between the semantic data and (ii) a mapping rule for generating a global semantic space for learning a semantic neural network, wherein the mapping rule is defined so that a difference value between (i) the distance between the semantic data determined based on the distance rule and (ii) a distance between locations on the global semantic space to which the semantic data is mapped is minimized for all the semantic data, and a distribution of the locations on the global semantic space to which the semantic data is mapped satisfies a required transmission power limitation condition; learning the semantic neural network based on a neural network supervised learning for (i) the global semantic space that is generated by the transmitting end based on the distance rule and the mapping rule and includes the semantic data mapped to satisfy the mapping rule and (ii) a semantic space of a semantic encoder neural network constituting the semantic neural network; and receiving, from the transmitting end, the semantic data based on the learned semantic neural network.

The present disclosure also provides a receiving end receiving semantic data in a semantic wireless communication system comprising a transmitter configured to transmit a radio signal; a receiver configured to receive the radio signal; at least one processor; and at least one computer memory operably connectable to the at least one processor, wherein the at least one computer memory is configured to store instructions performing operations based on being executed by the at least one processor, wherein the operations comprise receiving, from a transmitting end, (i) a distance rule for determining a distance between the semantic data determined based on a similarity between the semantic data and (ii) a mapping rule for generating a global semantic space for learning a semantic neural network, wherein the mapping rule is defined so that a difference value between (i) the distance between the semantic data determined based on the distance rule and (ii) a distance between locations on the global semantic space to which the semantic data is mapped is minimized for all the semantic data, and a distribution of the locations on the global semantic space to which the semantic data is mapped satisfies a required transmission power limitation condition; learning the semantic neural network based on a neural network supervised learning for (i) the global semantic space that is generated by the transmitting end based on the distance rule and the mapping rule and includes the semantic data mapped to satisfy the mapping rule and (ii) a semantic space of a semantic encoder neural network constituting the semantic neural network; and receiving, from the transmitting end, the semantic data based on the learned semantic neural network.

The present disclosure also provides a non-transitory computer readable medium (CRM) storing one or more instructions, wherein the one or more instructions executable by one or more processors are configured to allow a transmitting end transmitting semantic data in a semantic wireless communication system to transmit, to a receiving end, (i) a distance rule for determining a distance between the semantic data determined based on a similarity between the semantic data and (ii) a mapping rule for generating a global semantic space for learning a semantic neural network, wherein the mapping rule is defined so that a difference value between (i) the distance between the semantic data determined based on the distance rule and (ii) a distance between locations on the global semantic space to which the semantic data is mapped is minimized for all the semantic data, and a distribution of the locations on the global semantic space to which the semantic data is mapped satisfies a required transmission power limitation condition; generate the global semantic space based on the distance rule and the mapping rule, wherein the global semantic space includes the semantic data mapped to satisfy the mapping rule; learn the semantic neural network based on a neural network supervised learning for (i) the generated global semantic space and (ii) a semantic space of a semantic encoder neural network constituting the semantic neural network; and transmit, to the receiving end, the semantic data based on the learned semantic neural network.

The present disclosure also provides a device comprising one or more memories and one or more processors functionally connected to the one or more memories, wherein the one or more processors are configured to allow the device to transmit, to a receiving end, (i) a distance rule for determining a distance between the semantic data determined based on a similarity between the semantic data and (ii) a mapping rule for generating a global semantic space for learning a semantic neural network, wherein the mapping rule is defined so that a difference value between (i) the distance between the semantic data determined based on the distance rule and (ii) a distance between locations on the global semantic space to which the semantic data is mapped is minimized for all the semantic data, and a distribution of the locations on the global semantic space to which the semantic data is mapped satisfies a required transmission power limitation condition; generate the global semantic space based on the distance rule and the mapping rule, wherein the global semantic space includes the semantic data mapped to satisfy the mapping rule; learn the semantic neural network based on a neural network supervised learning for (i) the generated global semantic space and (ii) a semantic space of a semantic encoder neural network constituting the semantic neural network; and transmit, to the receiving end, the semantic data based on the learned semantic neural network.

Advantageous Effects

The present disclosure has an effect of enabling a transmitting end to transmit semantic data in a wireless communication system.

The present disclosure also has an effect of configuring a semantic communication system robust to signal distortion through channel by generating a global semantic space considering configuration of the global semantic space.

The present disclosure also has an effect of configuring a semantic communication system robust to signal distortion through channel by performing semantic communication through supervised learning of a semantic neural network based on a global semantic space considering configuration of the global semantic space.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

FIG. 1 is a view showing an example of a communication system applicable to the present disclosure.

FIG. 2 is a view showing an example of a wireless apparatus applicable to the present disclosure.

FIG. 3 is a view showing a method of processing a transmitted signal applicable to the present disclosure.

FIG. 4 is a view showing another example of a wireless device applicable to the present disclosure.

FIG. 5 is a view showing an example of a hand-held device applicable to the present disclosure.

FIG. 6 is a view showing physical channels applicable to the present disclosure and a signal transmission method using the same.

FIG. 7 is a view showing the structure of a radio frame applicable to the present disclosure.

FIG. 8 is a view showing a slot structure applicable to the present disclosure.

FIG. 9 is a view showing an example of a communication structure providable in a 6G system applicable to the present disclosure.

FIG. 10 illustrates examples of a semantic space generated through training of an artificial neural network constituting a semantic communication system.

FIG. 11 illustrates other examples of a semantic space generated through training.

FIG. 12 illustrates an example of a semantic communication system to which methods described in the present disclosure are applicable.

FIG. 13 illustrates an example of a global semantic space generated by a semantic space generator.

FIG. 14 illustrates an example of an operation of a semantic transmission system after training is completed.

FIGS. 15 and 16 illustrate superior performance of a semantic communication system to which a method described in the present disclosure is applied.

FIG. 17 is a flow chart illustrating an example of a method described in the present disclosure.

MODE FOR INVENTION

Embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an UpLink (UL).

Likewise, the mobile station may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-Apro. 3GPP NR may refer to technology after TS 38.xxx Release 15. 3GPP 6G may refer to technology TS Release 17 and/or Release 18. "xxx" may refer to a detailed number of a standard document.

LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure. Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100*a*, vehicles 100*b*-1 and 100*b*-2, an extended reality (XR) device 100*c*, a hand-held device 100*d*, a home appliance 100*e*, an Internet of Thing (IoT) device 100*f*, and an artificial intelligence (AI) device/server 100*g*. For example, the vehicles may include a vehicle having a wireless communication function, an autonomous vehicle, a vehicle capable of performing vehicle-to-vehicle communication, etc. The vehicles 100*b*-1 and 100*b*-2 may include an unmanned aerial vehicle (UAV) (e.g., a drone). The XR device 100*c* includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100*d* may include a smartphone, a smart pad, a wearable device (e.g., a smart watch or smart glasses), a computer (e.g., a laptop), etc. The home appliance 100*e* may include a TV, a refrigerator, a washing machine, etc. The IoT device 100*f* may include a sensor, a smart meter, etc. For example, the base station 120 and the network 130 may be implemented by a wireless device, and a specific wireless device 120*a* may operate as a base station/network node for another wireless device.

The wireless devices 100*a* to 100*f* may be connected to the network 130 through the base station 120. AI technology is applicable to the wireless devices 100*a* to 100*f*, and the wireless devices 100*a* to 100*f* may be connected to the AI server 100*g* through the network 130. The network 130 may be configured using a 3G network, a 4G (e.g., LTE) network or a 5G (e.g., NR) network, etc. The wireless devices 100*a* to 100*f* may communicate with each other through the base station 120/the network 130 or perform direct communication (e.g., sidelink communication) without through the base station 120/the network 130. For example, the vehicles 100*b*-1 and 100*b*-2 may perform direct communication (e.g., vehicle to vehicle (V2V)/vehicle to everything (V2X) communication). In addition, the IoT device 100*f* (e.g., a sensor) may perform direct communication with another IoT device (e.g., a sensor) or the other wireless devices 100*a* to 100*f*.

Wireless communications/connections 150*a*, 150*b* and 150*c* may be established between the wireless devices 100*a* to 100*f*/the base station 120 and the base station 120/the base station 120. Here, wireless communication/connection may be established through various radio access technologies (e.g., 5G NR) such as uplink/downlink communication 150*a*, sidelink communication 150*b* (or D2D communication) or communication 150*c* between base stations (e.g., relay, integrated access backhaul (IAB). The wireless device and the base station/wireless device or the base station and the base station may transmit/receive radio signals to/from each other through wireless communication/connection 150*a*, 150*b* and 150*c*. For example, wireless communication/connection 150*a*, 150*b* and 150*c* may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

FIG. 2 is a view showing an example of a wireless device applicable to the present disclosure.

Referring to FIG. 2, a first wireless device 200*a* and a second wireless device 200*b* may transmit and receive radio signals through various radio access technologies (e.g., LTE or NR). Here, {the first wireless device 200*a*, the second wireless device 200*b*} may correspond to {the wireless device 100*x*, the base station 120} and/or {the wireless device 100*x*, the wireless device 100*x*} of FIG. 1.

The first wireless device 200*a* may include one or more processors 202*a* and one or more memories 204*a* and may further include one or more transceivers 206*a* and/or one or more antennas 208*a*. The processor 202*a* may be configured to control the memory 204*a* and/or the transceiver 206*a* and to implement descriptions, functions, procedures, proposals, methods and/or operational flowcharts disclosed herein. For example, the processor 202*a* may process information in the memory 204*a* to generate first information/signal and then transmit a radio signal including the first information/signal through the transceiver 206*a*. In addition, the processor 202*a* may receive a radio signal including second information/signal through the transceiver 206*a* and then store information obtained from signal processing of the second information/signal in the memory 204*a*. The memory 204*a* may be connected with the processor 202*a*, and store a variety of information related to operation of the processor 202*a*. For example, the memory 204*a* may store software code including instructions for performing all or some of the processes controlled by the processor 202*a* or performing the descriptions, functions, procedures, proposals, methods and/or operational flowcharts disclosed herein. Here, the processor 202*a* and the memory 204*a* may be part of a communication modem/circuit/chip designed to implement wireless communication technology (e.g., LTE or NR). The transceiver 206*a* may be connected with the processor 202*a* to transmit and/or receive radio signals through one or more antennas 208*a*. The transceiver 206*a* may include a transmitter and/or a receiver. The transceiver 206*a* may be used interchangeably with a radio frequency (RF) unit. In the present disclosure, the wireless device may refer to a communication modem/circuit/chip.

The second wireless device 200*b* may include one or more processors 202*b* and one or more memories 204*b* and may further include one or more transceivers 206*b* and/or one or more antennas 208*b*. The processor 202*b* may be configured to control the memory 204*b* and/or the transceiver 206*b* and to implement the descriptions, functions, procedures, proposals, methods and/or operational flowcharts disclosed herein. For example, the processor 202*b* may process information in the memory 204*b* to generate third information/signal and then transmit the third information/signal through the transceiver 206*b*. In addition, the processor 202*b* may receive a radio signal including fourth information/signal through the transceiver 206*b* and then store information obtained from signal processing of the fourth information/signal in the memory 204*b*. The memory 204*b* may be connected with the processor 202*b* to store a variety of information related to operation of the processor 202*b*. For example, the memory 204*b* may store software code including instructions for performing all or some of the processes controlled by the processor 202*b* or performing the descriptions, functions, procedures, proposals, methods and/or operational flowcharts disclosed herein. Herein, the processor 202*b* and the memory 204*b* may be part of a communication modem/circuit/chip designed to implement wireless communication technology (e.g., LTE or NR). The transceiver 206*b* may be connected with the processor 202*b* to transmit and/or receive radio signals through one or more antennas 208*b*. The transceiver 206*b* may include a transmitter and/or a receiver. The transceiver 206*b* may be used interchangeably with a radio frequency (RF) unit. In the present disclosure, the wireless device may refer to a communication modem/circuit/chip.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs) and/or one or more service data unit (SDU) according to the descriptions, functions, procedures, proposals, methods and/or operational flowcharts disclosed herein. One or more processors 202*a* and 202*b* may generate messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be connected with one or more processors 202*a* and 202*b* to store various types of data, signals, messages, information, programs, code, instructions and/or commands. One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be connected with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. For example, one or more transceivers 206*a* and 206*b* may be connected with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other apparatuses. In addition, one or more processors 202*a* and 202*b* may perform control such that one or more transceivers 206*a* and 206*b* receive user data, control information or radio signals from one or more other apparatuses. In addition, one or more transceivers 206*a* and 206*b* may be connected with one or more antennas 208*a* and 208*b*, and one or more transceivers 206*a* and 206*b* may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

FIG. 3 is a view showing a method of processing a transmitted signal applicable to the present disclosure. For example, the transmitted signal may be processed by a signal processing circuit. At this time, a signal processing circuit 1200 may include a scrambler 300, a modulator 320, a layer mapper 330, a precoder 340, a resource mapper 350, and a signal generator 360. At this time, for example, the operation/function of FIG. 3 may be performed by the processors 202*a* and 202*b* and/or the transceiver 206*a* and 206*b* of FIG. 2. In addition, for example, the hardware element of FIG. 3 may be implemented in the processors 202*a* and 202*b* of FIG. 2 and/or the transceivers 206*a* and 206*b* of FIG. 2. In addition, for example blocks 310 to 350 may be implemented in the processors 202*a* and 202*b* of FIG. 2 and a block 360 may be implemented in the transceivers 206*a* and 206*b* of FIG. 2, without being limited to the above-described embodiments.

A codeword may be converted into a radio signal through the signal processing circuit 300 of FIG. 3. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 6. Specifically, the codeword may be converted into a bit sequence scrambled by the scrambler 310. The scramble sequence used for scramble is generated based in an initial value and the initial value may include ID information of a wireless device, etc. The scrambled bit sequence may be modulated into a modulated symbol sequence by the modulator 320. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 330. Modulation symbols of each transport layer may be mapped to corresponding antenna port(s) by the precoder 340 (precoding). The output z of the precoder 340 may be obtained by multiplying the output y of the layer mapper 330 by an N*M precoding matrix W. Here, N may be the number of antenna ports and M may be the number of transport layers. Here, the precoder 340 may perform precoding after transform precoding (e.g., discrete Fourier transform (DFT)) for complex modulation symbols. In addition, the precoder 340 may perform precoding without performing transform precoding.

The resource mapper 350 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 360 may generate a radio signal from the mapped modulation symbols, and the generated radio signal may be transmitted to another device through each antenna. To this end, the signal generator 360 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 310 to 360 of FIG. 3. For example, the wireless device (e.g., 200*a* or 200*b* of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

Structure of Wireless Device Applicable to the Present Disclosure

FIG. 4 is a view showing another example of a wireless device applicable to the present disclosure.

Referring to FIG. 4, a wireless device 400 may correspond to the wireless devices 200*a* and 200*b* of FIG. 2 and include various elements, components, units/portions and/or modules. For example, the wireless device 400 may include a communication unit 410, a control unit (controller) 420, a memory unit (memory) 430 and additional components 440. The communication unit may include a communication circuit 412 and a transceiver(s) 414. For example, the communication circuit 412 may include one or more processors 202*a* and 202*b* and/or one or more memories 204*a* and 204*b* of FIG. 2. For example, the transceiver(s) 414 may include one or more transceivers 206*a* and 206*b* and/or one or more antennas 208*a* and 208*b* of FIG. 2. The control unit 420 may be electrically connected with the communication unit 410, the memory unit 430 and the additional components 440 to control overall operation of the wireless device. For example, the control unit 320 may control electrical/mechanical operation of the wireless device based on a program/code/instruction/information stored in the memory unit 430. In addition, the control unit 420 may transmit the information stored in the memory unit 430 to the outside (e.g., another communication device) through the wireless/wired interface using the communication unit 410 over a wireless/wired interface or store information received from the outside (e.g., another communication device) through the wireless/wired interface using the communication unit 410 in the memory unit 430.

The additional components 440 may be variously configured according to the types of the wireless devices. For example, the additional components 440 may include at least one of a power unit/battery, an input/output unit, a driving unit or a computing unit. Without being limited thereto, the wireless device 400 may be implemented in the form of the robot (FIG. 1, 100*a*), the vehicles (FIG. 1, 100*b*-1 and 100*b*-2), the XR device (FIG. 1, 100*c*), the hand-held device (FIG. 1, 100*d*), the home appliance (FIG. 1, 100*e*), the IoT device (FIG. 1, 100*f*), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 4, various elements, components, units/portions and/or modules in the wireless device 400 may be connected with each other through wired interfaces or at least some thereof may be wirelessly connected through the communication unit 410. For example, in the wireless device 400, the control unit 420 and the communication unit 410 may be connected by wire, and the control unit 420 and the first unit (e.g., 130 or 140) may be wirelessly connected through the communication unit 410. In addition, each element, component, unit/portion and/or module of the wireless device 400 may further include one or more elements. For example, the control unit 420 may be composed of a set of one or more processors. For example, the control unit 420 may be composed of a set of a communication control processor, an application processor, an electronic control unit (ECU), a graphic processing processor, a memory control processor, etc. In another example, the memory unit 430 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

FIG. 5 is a view showing an example of a hand-held device applicable to the present disclosure.

FIG. 5 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 5, the hand-held device 500 may include an antenna unit (antenna) 508, a communication unit (transceiver) 510, a control unit (controller) 520, a memory unit (memory) 530, a power supply unit (power supply) 540*a*, an interface unit (interface) 540*b*, and an input/output unit 540*c*. An antenna unit (antenna) 508 may be part of the communication unit 510. The blocks 510 to 530/540*a* to 540*c* may correspond to the blocks 410 to 430/440 of FIG. 4, respectively.

The communication unit 510 may transmit and receive signals (e.g., data, control signals, etc.) to and from other wireless devices or base stations. The control unit 520 may control the components of the hand-held device 500 to perform various operations. The control unit 520 may include an application processor (AP). The memory unit 530 may store data/parameters/program/code/instructions necessary to drive the hand-held device 500. In addition, the memory unit 430 may store input/output data/information, etc. The power supply unit 540*a* may supply power to the hand-held device 500 and include a wired/wireless charging circuit, a battery, etc. The interface unit 540*b* may support connection between the hand-held device 500 and another external device. The interface unit 540*b* may include various ports (e.g., an audio input/output port and a video input/output port) for connection with the external device. The input/output unit 440*c* may receive or output video information/signals, audio information/signals, data and/or user input information. The input/output unit 540*c* may include a camera, a microphone, a user input unit, a display 540*d*, a speaker and/or a haptic module.

For example, in case of data communication, the input/output unit 540*c* may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit 530 and then output through the input/output unit 540*c* in various forms (e.g., text, voice, image, video and haptic).

Physical Channels and General Signal Transmission

In a radio access system, a UE receives information from a base station on a DL and transmits information to the base station on a UL. The information transmitted and received between the UE and the base station includes general data information and a variety of control information. There are many physical channels according to the types/usages of information transmitted and received between the base station and the UE.

FIG. 5 is a view showing physical channels applicable to the present disclosure and a signal transmission method using the same.

The UE which is turned on again in a state of being turned off or has newly entered a cell performs initial cell search operation in step S1011 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a physical broadcast channel (PBCH) signal from the base station and acquire intra-cell broadcast information. Meanwhile, the UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S612, thereby acquiring more detailed system information.

Thereafter, the UE may perform a random access procedure such as steps S613 to S616 in order to complete access to the base station. To this end, the UE may transmit a preamble through a physical random access channel (PRACH) (S613) and receive a random access response (RAR) to the preamble through a physical downlink control channel and a physical downlink shared channel corresponding thereto (S614). The UE may transmit a physical uplink shared channel (PUSCH) using scheduling information in the RAR (S615) and perform a contention resolution procedure such as reception of a physical downlink control channel signal and a physical downlink shared channel signal corresponding thereto (S616).

The UE, which has performed the above-described procedures, may perform reception of a physical downlink control channel signal and/or a physical downlink shared channel signal (S617) and transmission of a physical uplink shared channel (PUSCH) signal and/or a physical uplink control channel (PUCCH) signal (S618) as general uplink/downlink signal transmission procedures.

The control information transmitted from the UE to the base station is collectively referred to as uplink control information (UCI). The UCI includes hybrid automatic repeat and request acknowledgement/negative-ACK (HARQ-ACK/NACK), scheduling request (SR), channel quality indication (CQI), precoding matrix indication (PMI), rank indication (RI), beam indication (BI) information, etc. At this time, the UCI is generally periodically transmitted through a PUCCH, but may be transmitted through a PUSCH in some embodiments (e.g., when control information and traffic data are simultaneously transmitted). In addition, the UE may aperiodically transmit UCI through a PUSCH according to a request/instruction of a network.

FIG. 7 is a view showing the structure of a radio frame applicable to the present disclosure.

UL and DL transmission based on an NR system may be based on the frame shown in FIG. 7. At this time, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). At this time, each slot may include 12 or 14 OFDM(A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| μ | $N_{symb}^{slot}$ | $N_{slot}^{frame,\mu}$ | $N_{slot}^{subframe,\mu}$ |
|---|---|---|---|
| 2 | 12 | 40 | 4 |

In Tables 1 and 2 above, Nslotsymb may indicate the number of symbols in a slot, Nframe, μslot may indicate the number of slots in a frame, and Nsubframe, μslot may indicate the number of slots in a subframe.

In addition, in a system, to which the present disclosure is applicable, OFDM(A) numerology (e.g., SCS, CP length, etc.) may be differently set among a plurality of cells merged to one UE. Accordingly, an (absolute time) period of a time resource (e.g., an SF, a slot or a TTI) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In addition, for example, in a communication system, to which the present disclosure is applicable, the above-described numerology may be differently set. For example, a terahertz wave (THz) band may be used as a frequency band higher than FR2. In the THz band, the SCS may be set greater than that of the NR system, and the number of slots may be differently set, without being limited to the above-described embodiments. The THz band will be described below.

FIG. 8 is a view showing a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality (e.g., 12) of consecutive subcarriers in the frequency domain.

In addition, a bandwidth part (BWP) is defined as a plurality of consecutive (P)RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a resource element (RE) and one complex symbol may be mapped.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as “intelligent connectivity”, “deep connectivity”, “holographic connectivity” and “ubiquitous connectivity”, and the 6G system may satisfy the requirements shown in Table 4 below. That is, Table 4 shows the requirements of the 6G system.

TABLE 4

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

FIG. 9 is a view showing an example of a communication structure providable in a 6G system applicable to the present disclosure.

Referring to FIG. 9, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

- Satellites integrated network: To provide a global mobile group, 6G will be integrated with satellite. Integrating terrestrial waves, satellites and public networks as one wireless communication system may be very important for 6G.
- Connected intelligence: Unlike the wireless communication systems of previous generations, 6G is innovative and wireless evolution may be updated from “connected things” to “connected intelligence”. AI may be applied in each step (or each signal processing procedure which will be described below) of a communication procedure.
- Seamless integration of wireless information and energy transfer: A 6G wireless network may transfer power in order to charge the batteries of devices such as smartphones and sensors. Therefore, wireless information and energy transfer (WIET) will be integrated.
- Ubiquitous super 3-dimension connectivity: Access to networks and core network functions of drones and very low earth orbit satellites will establish super 3D connection in 6G ubiquitous.

In the new network characteristics of 6G, several general requirements may be as follows.

- Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.
- Ultra-dense heterogeneous network: Ultra-dense heterogeneous networks will be another important characteristic of the 6G communication system. A multi-tier network composed of heterogeneous networks improves overall QoS and reduce costs.
- High-capacity backhaul: Backhaul connection is characterized by a high-capacity backhaul network in order to support high-capacity traffic. A high-speed optical fiber and free space optical (FSO) system may be a possible solution for this problem.
- Radar technology integrated with mobile technology: High-precision localization (or location-based service) through communication is one of the functions of the 6G wireless communication system. Accordingly, the radar system will be integrated with the 6G network.
- Softwarization and virtualization: Softwarization and virtualization are two important functions which are the bases of a design process in a 5 GB network in order to ensure flexibility, reconfigurability and programmability.

Semantic Communication

Wireless communication systems are being widely deployed to provide various types of communication services such as voice and data. In general, the wireless communication system is a multiple access system that can support communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, a space division multiple access (SDMA) system, an orthogonal frequency division multiple access (OFDMA) system, a single carrier-frequency division multiple access (SC-FDMA) system, and an interleave division multiple access (IDMA) system. The wireless communication system is designed based on an information theory, which corresponds to "symbol communication" that transmits and receives large bandwidth communication data without error.

Semantic communication is communication that conveys intent or meaning between a sender and a receiver, unlike the existing symbolic communication system. In terms of communication hierarchy, the semantic communication is at the top of symbolic communication. In other words, the semantic communication matches the meaning and purpose of communication between the sender and the receiver based on the symbolic communication. Communication levels can be divided into three levels below, and the semantic communication corresponds to Level B below.

Level A: How accurately can the symbols of communication be transmitted?(The technical problem).

Level B: How precisely do the transmitted symbols convey the desired meaning?(The semantic problem).

Level C: How effectively does the received meaning affect conduct in the desired way?(The effectiveness problem)

Recently, due to the development of AI technology, semantic communication methods have been proposed, and attempts are being made to apply artificial neural networks to the problem of conveying semantics to symbols. The semantic communication deals with the problem of minimizing semantic errors exchanged between the sender and the receiver. A semantic communication system consists of (i) an encoder neural network for converting semantics into symbols, (ii) a communication channel, and (iii) a decoder neural network for converting symbols passing through the communication channel into semantics. A channel coding function may also be added to the encoder neural network and the decoder neural network to reduce errors of symbols to be transmitted on the channel. Through this, the encoder neural network and the decoder neural network may be configured together with a semantic neural network.

A semantic error may be defined as semantic similarity. In the symbol communication, if an error occurs in even one of the transmitted and received data, retransmission of the data is required. On the other hand, since there is a possibility that the transmitted data can be recovered without retransmission depending on a situation between the sender and the receiver even if an error occurs in the semantic communication, performance of the semantic communication may be measured based on the degree of similarity. More specifically, in a semantic communication system for word transmission, even if the word "beautiful" is transmitted from a transmitting end to a receiving end and the word "gorgeous" is received at the receiving end due to an error occurring on the channel, the words "beautiful" and "gorgeous" have great semantic similarity to each other, and thus it may be interpreted that the performance degradation is not significant. That is, since the words "beautiful" and "gorgeous" are words with similar meaning, even if the word "beautiful" transmitted from the transmitting end is received as the word "gorgeous" at the receiving end, the performance of the semantic communication may be considered good. Although the semantic communication system for word transmission is described above as an example, the semantic communication system may exist in various forms, such as text sentence transmission and reception, image transmission and reception, video transmission and reception, and agent command transmission and reception, based on the meaning. In some cases, a type of semantic data transmitted by the transmitting end may be different from a type of semantic data received by the receiving end. For example, when a text sentence is transmitted from the transmitting end, whether or not the transmitted text sentence is a logical proposition may be considered important from a point of view of the receiving end.

When the encoder neural network and the decoder neural network in the existing semantic communication are trained, the encoder neural network formed a symbol space in which the semantic similarity is not globally reflected on a global semantic space and is locally reflected. The symbol space may be called a latent space or a semantic space, etc., and may be called in various forms within the scope of the same and similar interpretation. Even if transmitted symbols undergo distortion on the communication channel and are distorted within the semantic space, the semantic system can be robust to distortion only if the distorted transmitted symbols correspond to semantic symbols similar to the transmitted symbols before the distortion occurs, considering the configuration of the global semantic space. That is, when there is a large degree of similarity between (i) a semantic symbol corresponding to a location in the semantic space of a transmitted symbol before the distortion occurs and (ii) a semantic symbol corresponding to a location in the semantic space of a transmitted symbol where the distortion occurs, the semantic system on which the transmitted symbol is transmitted may be a semantic system that is robust to distortion.

More specifically, in the semantic communication system for word transmission, the semantic similarity may be reflected as a categorical entropy between a probability of occurrence p of a first word $w_l$ in a transmission sentence s transmitted by the transmitting end and a probability of occurrence q of each word constituting a reception sentence s received by the receiving end, and this may be expressed as Equation below.

$$\mathcal{L}_{CE}(s, \hat{s}; \alpha, \beta, \chi, \delta) = -\sum_{l=1} q(w_l)\log(p(w_l)) + (1 - q(w_l))\log(1 - p(w_l)) \quad \text{[Equation 1]}$$

When an artificial neural network constituting the existing semantic communication system is trained, a loss function (i.e., semantic similarity) between a transmission signal s transmitted by the transmitting end and a reception signal ŝ received by the receiving end is learned only for a space (local similarity) around the transmission signal s on the semantic space due to perturbation of the communication channel.

Examples of the semantic space generated through training of the artificial neural network constituting the semantic communication system are described below with reference to FIG. 10.

FIG. 10 illustrates examples of a semantic space generated through training of an artificial neural network constituting a semantic communication system.

First, FIG. 10(*a*) illustrates an example of a semantic space generated through training of an artificial neural network constituting the existing semantic communication system. The semantic space (latent space) illustrated in FIG. 10(*a*) consists of two dimensions. The semantic space is generated as a loss function between a transmission signal (symbol) s transmitted by a transmitting end and a reception signal ŝ received by a receiving end is locally learned for a location on a semantic space corresponding to the transmission signal s transmitted by the transmitting end. That is, if there is a small distortion on the channel of the transmission signal s representing the word "beautiful," the transmission signal s received at the receiving end may be mapped to the word with the similar meaning to the word "beautiful" existing around a location on a semantic space corresponding to the word "beautiful". In other words, as the word "beautiful" is transmitted from the transmitting end and the receiving end recognizes the word "beautiful" as the word with the similar meaning to the word "beautiful," a large error may not occur. In this case, the semantic similarity between the transmission signal s where the distortion does not occur and a transmission signal where the distortion occurs may have a large value.

On the other hand, if there is a large distortion on the channel of the transmission signal s representing the word "beautiful", the transmission signal s is distorted at the receiving end, and the distorted transmission signal s at the receiving end is mapped to a location 1020*a* on a semantic space of the word "disgusting" or a location 1030*a* on a semantic space of the word "weird" having a completely different meaning from the word "beautiful." That is, even though the word "beautiful" is transmitted from the transmitting end, the receiving end recognizes the word "beautiful" as the word "disgusting" or "weird," which may cause a serious error. In this case, the semantic similarity between the transmission signal s and the reception signal may have a small value.

Next, FIG. 10(*b*) illustrates an example of a semantic space generated by training an artificial neural network constituting a semantic communication system through a method described in the present disclosure. The semantic space (latent space) illustrated in FIG. 10(*b*) consists of two dimensions. The semantic space is generated as a loss function between a transmission signal (symbol) s transmitted by a transmitting end and a reception signal ŝreceived by a receiving end is learned for a location on a semantic space corresponding to the transmission signal s transmitted by the transmitting end by globally considering the semantic space. That is, if there is a small distortion on the channel of the transmission signal s representing the word "beautiful," the transmission signal s received at the receiving end may be naturally mapped to the word with the similar meaning to the word "beautiful" existing around a location on a semantic space corresponding to the word "beautiful". On the other hand, even if there is a large distortion on the channel of the transmission signal s representing the word "beautiful," the distorted transmission signal s is mapped to a location 1020*b* on a semantic space of the word "graceful" or a location 1030*b* on a semantic space of the word "good" with the same/similar meaning to the word "beautiful." That is, as the word "beautiful" is transmitted from the transmitting end, and the receiving end recognizes the word "beautiful" as the word "graceful" or "good" even if the distortion due to the channel greatly occurs, a serious error may not occur. In this case, the semantic similarity between the transmission signal s and the reception signal may have a large value. In other words, the semantic space generated by globally considering the semantic space may refer to a space configured so that meanings with the same/similar meaning among all the meanings which may exist on the semantic space are present at contiguous locations.

FIG. 11 illustrates other examples of a semantic space generated through training.

More specifically, the examples of FIG. 11 are examples of a semantic space generated by a semantic system that transmits cursive letters 0 to 9. FIGS. 11(*a*) to 11(*c*) illustrate three examples where an encoder neural network and a decoder neural network, which of each transmits cursive letters 0 to 9, have different initial weights. It can be seen from FIGS. 11(*a*) to 11(*c*) that semantic spaces are differently configured by the different initial weights. That is, when the encoder neural network and the decoder neural network are trained, the semantic spaces may be differently configured because the initial weights are random. A case where the encoder/decoder artificial neural networks constitute a text sentence transmission system may also be affected by a phenomenon due to the random initial weights. When the encoder/decoder artificial neural networks are trained, a loss function is a categorical cross entropy based on the embedding of each word in the sentence. The loss function is a cross entropy of a probability for each word in a transmitted sentence and a received sentence and may be regarded as one semantic similarity. In the existing semantic communication system, when the encoder/decoder neural networks are trained, a semantic space may be locally generated based on a pair of a transmitted sentence and a received sentence and initial weight values.

Method of Designing a Semantic Communication System Robust to Communication Distortion Proposed in the Present Disclosure The following describes in detail a method of generating a semantic space by globally considering the configuration of the semantic space described above with reference to FIG. 10(*b*). That is, the present disclosure proposes a method of designing a semantic communication system robust to communication.

More specifically, the present disclosure proposes a global semantic generator [proposal 1] reflecting a global semantic space and a semantic communication system [proposal 2] based on a neural network for adversarial learning.

Before the proposal 1 and the proposal 2 are described in detail, an overall structure of a semantic communication system proposed in the present disclosure is first described.

FIG. 12 illustrates an example of a semantic communication system to which methods described in the present disclosure are applicable.

Referring to FIG. 12, a semantic communication system to which methods described in the present disclosure are applicable may include a semantic encoder neural network 1210, a semantic decoder neural network 1230, and a communication channel 1220 between the semantic encoder neural network 1210 and the semantic decoder neural network 1230. In addition to the components 1210 to 1230, the semantic communication system to which the methods described in the present disclosure are applicable may further include a global semantic space generator 1240 generating a global semantic space and a discriminator 1250.

Global Semantic Space Generator—Proposal 1

A global semantic space generator may be understood as a function that corresponds a semantic vector s to an n-dimensional global semantic space. That is, the global semantic space generator may map the semantic vector s corresponding to semantic data to a specific location x on the global semantic space. This operation may be expressed as $\varphi: s \rightarrow x$.

The global semantic space generator may calculate a distance between two semantic data constituting a semantic data pair with respect to semantic data pairs (s, s') of all cases that can be formed by selecting two semantic data among all semantic data. In this instance, the distance between the two semantic data constituting the semantic data pair may be calculated based on a distance rule defined for calculating the distance between the two semantic data. The distance rule defined for calculating the distance between the two semantic data may be expressed as $d_f(s_i,s_j)$, where $s_i$ and $s_j$ each denote semantic data. The global semantic space generator performs unsupervised learning based on $d_f(s_i, s_j)$. Afterwards, the global semantic space generator maps all the semantic data to a location on a semantic space corresponding to each of all the semantic data. In this instance, all the semantic data may be mapped on the semantic spaces based on a specific mapping rule. The mapping rule may be to ensure that a distance $d_g$ (x, x') between two locations on the semantic space reflects $d_f$ as much as possible. Here, x, and x' each denote a location on the semantic space corresponding to each of two semantic data constituting the semantic data pair.

The mapping rule ensuring that the distance $d_g$ (x, x') between the two locations on the semantic space reflects $d_f$ as much as possible may be expressed by Equation below.

$$\arg_{\varphi(s_i),\varphi(s_j)} \min \sum_i \sum_j \|d_f(s_i, s_j) - d_g(x_i, y_j)\| \quad \text{[Equation 2]}$$

That is, the above equation may mean that the mapping rule is defined so that a difference value between (i) a distance between semantic data determined based on the distance rule and (ii) a distance between locations on the global semantic space, to which the semantic data is mapped, is minimized for all the semantic data. Here, $d_f(s_i, s_j)$ may be mainly given by the artificial neural network, and may be cosine similarity of an output of Bidirectional Encoder Representations from Transformers (BERT) as an example of text transmission. In addition, $d_g(x_i, y_j)$ may be Euclidean distance between two locations in the semantic space, or hamming distance for binary data transmission. An optimization problem expressed as the Equation 2 is NP-complete and thus can be solved through various types of general sub-optimum algorithms. Examples of the sub-optimum algorithms may include Hierarchical clustering, k-means clustering, particle based optimization, etc. An example where the generation of the global semantic space through solving the optimization problem can be applied may be MNIST digit transmission.

The distribution of locations x on the semantic space to which the semantic data is mapped satisfies a transmission power limitation condition P. The transmission power limitation condition P may be expressed by Equation below.

$$\text{s.t: } E[\|x^2\|] < P \text{ or } \max x^2 < P \quad \text{[Equation 3]}$$

That is, the Equation means that an average of the square values of the locations x on the semantic space to which the semantic data is mapped is less than P, or a maximum value of the square values of the locations x is less than P.

Before the global semantic space generator at the transmitting end generates the global semantic space, the transmitting end may transmit to the receiving end (i) a distance rule for determining a distance between the semantic data determined based on similarity between the semantic data and (ii) a mapping rule for generating a global semantic space for training a semantic neural network.

FIG. 13 illustrates an example of a global semantic space generated by a semantic space generator. More specifically, FIG. 13 relates to a case where the definition of semantic similarity is assumed to be a circle distance in a circular clock consisting of 0 to 9. The semantic space of FIG. 13 is designed by arranging a semantic space generator φ(s) with a greedy algorithm for main semantic elements 0 to 9 and generating pseudo-random variables for sub-semantic elements, such as fonts.

In addition, it can be seen from FIG. 10(*b*) that semantic data with the same meaning forms one cluster on the semantic space (1010*b* to 1030*b*). Therefore, the global semantic space may be understood as including at least one cluster constructed based on semantic data mapped to satisfy the mapping rule. In this instance, the global semantic space may be configured so that clusters including semantic data with similar meanings among the at least one cluster are present contiguous to each other. That is, as the global semantic space is configured so that the clusters including semantic data with the similar meanings are contiguous to each other, even if distortion occurs in semantic data transmitted from the transmitting end, the receiving end can acquire semantic data with a meaning similar to the meaning of the semantic data before the distortion occurs.

On the contrary, the global semantic space may be configured so that a distance between clusters including semantic data with dissimilar meanings among the at least one cluster is greater than a specific value. That is, as the global semantic space is configured so that the distance between the clusters including semantic data with the dissimilar meanings is greater than the specific value, if distortion occurs in semantic data transmitted from the transmitting end, it is possible to prevent a problem in that the receiving end acquires semantic data with a completely different meaning from the meaning of the semantic data before the distortion occurs. In other words, as (i) a location on a semantic space of semantic data transmitted from the transmitting end and (ii) a location on a semantic space corresponding to semantic data with a completely different meaning from a meaning of the semantic data transmitted from the transmitting end are located far enough away from each other, even if the semantic data transmitted from the transmitting end is distorted as it passes through the channel, there can be a reduction in the probability that the receiving end acquires the semantic data with the completely different meaning from the meaning of the semantic data transmitted from the transmitting end.

In addition, the specific value may be determined based on a channel state between the transmitting end and the receiving end. More specifically, in a channel environment where distortion of a signal through the channel is large, a location on a semantic space of semantic data transmitted from the transmitting end may greatly change after the semantic data passes through the channel. Therefore, in this case, a distance between (i) a location on a semantic space of semantic data transmitted from the transmitting end and (ii) a location on a semantic space corresponding to semantic data with a completely different meaning from a meaning of the semantic data transmitted from the transmitting end may have a large value. On the contrary, in a channel environment where distortion of a signal through the channel is small, a location on a semantic space of semantic data transmitted from the transmitting end may not greatly change after the semantic data passes through the channel. Therefore, in this case, even if a distance between (i) a location on a semantic space of semantic data transmitted from the transmitting end and (ii) a location on a semantic space corresponding to semantic data with a completely different meaning from a meaning of the semantic data transmitted from the transmitting end has a small value, it may be sufficient. As above, based on the channel environment by differently setting a distance between (i) a location on a semantic space of semantic data transmitted from the transmitting end and (ii) a location on a semantic space corresponding to semantic data with a completely different meaning from a meaning of the semantic data transmitted from the transmitting end, a size of the global semantic space can be set appropriately.

In order to adaptively set a distance between semantic data with different meanings on the semantic space based on the channel state (environment), the following operation may be performed between the transmitting end and the receiving end. First, the transmitting end may receive, from the receiving end, a signal for measurement of the channel state. Next, the transmitting end may transmit, to the receiving end, information on the channel state measured based on the signal. Next, the transmitting end may receive, from the receiving end, information on a specific value for setting a distance on a global semantic space between semantic data with different meanings, determined based on the information on the channel state. In this instance, the global semantic space may be generated based on a distance rule, a mapping rule, and the information on the specific value by a semantic space generator. The operations described above may be more preferably performed before the semantic space generator performs an operation for generating the global semantic space. The operations described above may also be performed by being absorbed into a CSI reporting operation of a UE in the existing communication system.

Adversarial Semantic Transmission System—Proposal 2

An adversarial semantic transmission system proposed in the present proposal includes a semantic encoder, a channel, a decoder, and a feature extractor. The semantic encoder, the channel, and the decoder are the same as the existing semantic communication system. The semantic encoder includes a global semantic space generation network that has been trained and is used as an encoder, and a channel encoder connected behind the global semantic space generation network. The semantic encoder is trained by fixing its weight, and a loss function includes a weighted sum of a categorical cross entropy L(s, s') and an amount of mutual information L(z, y). They are optimized at the same time. If the semantic transmission system is applied to an image transmission, a convolutional filter and a general multi-layer neural network may be applied to the feature extractor and a semantic neural network. If the semantic transmission system is applied to a text sentence transmission, embedding and transformer or RNN neural network may be applied to the feature extractor and the semantic neural network. Further, the channel encoder/decoder may consist of a multi-layer neural network.

If the training of a global semantic space generator is completed, feature extraction, embedding, and one transmission layer generation network are used for adversarial training of the semantic encoder and the decoder. A process of performing adversarial learning may be expressed as equation below.

$$\min_G \max_D E_{x\sim p_\varphi}[\log(D(x)] + E_{z\sim p(z)}[\log(1 - D(G(z))] \quad \text{[Equation 4]}$$

The training of the adversarial semantic transmission system may consist of two sequences. First, training on the semantic space generation network is performed. After the training on the global semantic space generation network is completed, the semantic space generation network serves as a real generation network, and the semantic encoder serves as a fake generation network. Hence, the adversarial learning can be performed.

After the training of the adversarial semantic transmission system is completed, the semantic transmission system can operate without the global semantic space generator and the discriminator.

FIG. 14 illustrates an example of an operation of a semantic transmission system after training is completed.

Referring to FIG. 14, a semantic transmission system after training is completed can check that only a semantic encoder 1410, a channel 1420, and a semantic decoder 1430 operate for semantic communication.

Effect

The semantic communication system described in the present disclosure has an effect of being robust to noise by constructing a transmission space or a semantic space considering the global similarity of semantic data.

FIGS. 15 and 16 illustrate superior performance of a semantic communication system to which a method described in the present disclosure is applied.

Referring to FIG. 15, if numeric images are transmitted on the semantic communication system proposed in the present disclosure using MNIST data, performance of the semantic communication system can be improved by using the global semantic space proposed in the present disclosure. This experiment was conducted by applying the concept of the existing system and the semantic similarity defined as the circle distance on the clock of numbers described above with reference to FIG. 13. The semantic space is two-dimensional and is a transmission symbol space. As can be seen from reference numerals 1510 and 1520 of FIG. 15, the performance of the semantic communication system proposed in the present disclosure is superior to the performance of the conventional semantic communication system.

Next, in FIG. 16, FIG. 16(*a*) illustrates a record of the semantic space performed on the conventional semantic communication system, and FIG. 16(*b*) illustrates a record of the semantic space performed on the semantic communication system proposed in the present disclosure. In this experiment, the average transmission power was used as the power limitation condition.

FIG. 17 is a flow chart illustrating an example of a method described in the present disclosure.

First, a transmitting end transmits to a receiving end (i) a distance rule for determining a distance between semantic data determined based on similarity between the semantic data and (ii) a mapping rule for generating a global semantic space for learning a semantic neural network, in S1710.

The mapping rule is defined so that a difference value between (i) the distance between the semantic data determined based on the distance rule and (ii) a distance between locations on the global semantic space, to which the semantic data is mapped, is minimized for all the semantic data, and a distribution of the locations on the global semantic space to which the semantic data is mapped satisfies a required transmission power limitation condition.

Next, the transmitting end generates the global semantic space based on the distance rule and the mapping rule, in S1720.

The global semantic space includes the semantic data mapped to satisfy the mapping rule.

Next, the transmitting end learns the semantic neural network based on neural network supervised learning for (i) the generated global semantic space and (ii) a semantic space of a semantic encoder neural network constituting the semantic neural network, in S1730. In this instance, the neural network supervised learning may include adversarial learning, etc.

Finally, the transmitting end transmits, to the receiving end, the semantic data based on the learned semantic neural network, in S1740.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure has described focusing on examples applying to the 3GPP LTE/LTE-A and the 5G system, but can be applied to various wireless communication systems in addition to the 3GPP LTE/LTE-A and the 5G system.

The invention claimed is:

1. A method of transmitting, by a transmitting end, semantic data in a semantic wireless communication system, the method comprising:

transmitting, to a receiving end, (i) a distance rule for determining a distance between the semantic data determined based on a similarity between the semantic data and (ii) a mapping rule for generating a global semantic space for learning a semantic neural network, wherein the mapping rule is defined so that a difference value between (i) the distance between the semantic data determined based on the distance rule and (ii) a distance between locations on the global semantic space to which the semantic data is mapped is minimized for all the semantic data, and a distribution of the locations on the global semantic space to which the semantic data is mapped satisfies a required transmission power limitation condition;

generating the global semantic space based on the distance rule and the mapping rule, wherein the global semantic space includes the semantic data mapped to satisfy the mapping rule;

learning the semantic neural network based on a neural network supervised learning for (i) the generated global semantic space and (ii) a semantic space of a semantic encoder neural network constituting the semantic neural network; and transmitting, to the receiving end, the semantic data based on the learned semantic neural network.

2. The method of claim 1, wherein the global semantic space includes at least one cluster constructed based on the semantic data mapped to satisfy the mapping rule.

3. The method of claim 2, wherein the global semantic space is configured so that clusters including semantic data with similar meanings among the at least one cluster are contiguous to each other.

4. The method of claim 3, wherein the global semantic space is configured so that a distance between clusters including semantic data with dissimilar meanings among the at least one cluster is greater than a specific value.

5. The method of claim 4, wherein the specific value is determined based on a channel state between the transmitting end and the receiving end.

6. The method of claim 5, further comprising:

receiving, from the receiving end, a signal for a measurement of the channel state;

transmitting, to the receiving end, information on the channel state measured based on the signal; and receiving, from the receiving end, information on the specific value determined based on the information on the channel state, wherein the global semantic space is generated based on the information on the specific value.

7. The method of claim 6, wherein a magnitude of the specific value is determined in proportion to a degree of signal distortion through a channel between the transmitting end and the receiving end.

8. The method of claim 1, wherein the mapping rule is generated based on an equation below:

$$\arg_{\varphi(s_i),\varphi(s_j)} \min \sum_i \sum_j \|d_f(s_i, s_j) - d_g(x_i, y_j)\| \quad \text{[Equation]}$$

where si and sj are the semantic data, $x_i$, $y_j$ are locations on the global semantic space of si and sj, and $d_f$ and $d_g$, are the distance rule.

9. The method of claim 1, wherein the neural network supervised learning is an adversarial learning, and wherein a semantic space generator generating the global semantic space serves as a real generation network, and the semantic encoder neural network serves as a fake generation network, thereby performing the adversarial learning.

10. The method of claim 1, wherein the transmission power (P) limitation condition satisfies an equation below:

$$E[\|x^2\|] < P \text{ or } \max x^2 < P \quad \text{[Equation]}$$

where x is locations on the global semantic space of the semantic data.

11. A transmitting end transmitting semantic data in a semantic wireless communication system, the transmitting end comprising:

a transmitter configured to transmit a radio signal;

a receiver configured to receive the radio signal;

at least one processor; and at least one computer memory operably connectable to the at least one processor, wherein the at least one computer memory is configured to store instructions performing operations based on being executed by the at least one processor, wherein the operations comprise:

transmitting, to a receiving end, (i) a distance rule for determining a distance between the semantic data determined based on a similarity between the semantic data and (ii) a mapping rule for generating a global semantic space for learning a semantic neural network, wherein the mapping rule is defined so that a difference value between (i) the distance between the semantic data determined based on the distance rule and (ii) a distance between locations on the global semantic space to which the semantic data is mapped is minimized for all the semantic data, and a distribution of the locations on the global semantic space to which the semantic data is mapped satisfies a required transmission power limitation condition;

generating the global semantic space based on the distance rule and the mapping rule, wherein the global semantic space includes the semantic data mapped to satisfy the mapping rule;

learning the semantic neural network based on a neural network supervised learning for (i) the generated global semantic space and (ii) a semantic space of a semantic encoder neural network constituting the semantic neural network; and transmitting, to the receiving end, the semantic data based on the learned semantic neural network.

12. A method of receiving, by a receiving end, semantic data in a semantic wireless communication system, the method comprising:

receiving, from a transmitting end, (i) a distance rule for determining a distance between the semantic data determined based on a similarity between the semantic data and (ii) a mapping rule for generating a global semantic space for learning a semantic neural network, wherein the mapping rule is defined so that a difference value between (i) the distance between the semantic data determined based on the distance rule and (ii) a distance between locations on the global semantic space to which the semantic data is mapped is minimized for all the semantic data, and a distribution of the locations on the global semantic space to which the semantic data is mapped satisfies a required transmission power limitation condition;

learning the semantic neural network based on a neural network supervised learning for (i) the global semantic space that is generated by the transmitting end based on the distance rule and the mapping rule and includes the semantic data mapped to satisfy the mapping rule and (ii) a semantic space of a semantic encoder neural network constituting the semantic neural network; and receiving, from the transmitting end, the semantic data based on the learned semantic neural network.

* * * * *